United States Patent [19]

Muroi et al.

[11] Patent Number: 4,538,697
[45] Date of Patent: Sep. 3, 1985

[54] VIBRATION-ABSORBING SYSTEM FOR AN AUTOMOTIVE VEHICLE

[75] Inventors: Akira Muroi, Kawasaki; Masakatsu Sano, Tokyo; Junichi Kamiya, Yokohama; Masao Okajima, Yamato; Arifumi Inoue, Yokohama, all of Japan

[73] Assignee: Nissan Motor Company, Limited, Yokohama, Japan

[21] Appl. No.: 320,136

[22] Filed: Nov. 10, 1981

[30] Foreign Application Priority Data

Nov. 13, 1980 [JP] Japan ............................ 55-159799

[51] Int. Cl.³ .................... B60K 11/04; B60R 18/02
[52] U.S. Cl. ................... 180/68.4; 180/68.5; 180/300; 181/207
[58] Field of Search ............ 180/68 R, 68.5, 300, 180/89.1, 89.12, 68.4; 248/559, 635, 503; 165/67, 135; 267/140, 140.1, 153; 181/204, 207

[56] References Cited

U.S. PATENT DOCUMENTS

| 1,465,660 | 8/1923 | Alborn | 180/68.5 |
| 1,791,815 | 2/1931 | Jantsch | 180/68.5 |
| 3,340,948 | 9/1967 | Deckert | 180/68 R |
| 3,463,259 | 8/1969 | Dangauthier | 180/300 |
| 3,874,818 | 4/1975 | Saunders | 416/144 |
| 4,121,682 | 10/1978 | Schaal et al. | 180/68 R |
| 4,377,218 | 3/1983 | Fukushima | 180/300 |

FOREIGN PATENT DOCUMENTS

| 0006068 | 12/1979 | European Pat. Off. . | |
| 2634990 | 2/1978 | Fed. Rep. of Germany . | |
| 2706473 | 8/1978 | Fed. Rep. of Germany . | |
| 2932077 | 10/1980 | Fed. Rep. of Germany . | |
| 1497604 | 10/1967 | France . | |
| 2098600 | 3/1972 | France . | |
| 2126551 | 10/1972 | France . | |
| 2336268 | 7/1977 | France . | |
| 2455524 | 11/1980 | France | 180/68 R |
| 44-5025 | 3/1969 | Japan . | |
| 212654 | 12/1966 | Sweden | 267/140.1 |
| 2054493 | 2/1981 | United Kingdom | 180/300 |
| 0749701 | 7/1980 | U.S.S.R. | 180/68 R |

Primary Examiner—David M. Mitchell
Attorney, Agent, or Firm—Schwartz, Jeffery, Schwaab, Mack, Blumenthal & Evans

[57] ABSTRACT

A vibration-absorbing system for an automotive vehicle with a vehicle body, includes an automotive vehicle accessory and a mounting device. The mounting device has a resiliency. The mounting device attaches the accessory to the vehicle body so that the accessory will be resiliently supported on the vehicle body. The accessory with the mounting device is able to be vibrated and has an eigenfrequency in relation to the vibration thereof. The eigenfrequency is set to a relatively low value.

13 Claims, 12 Drawing Figures

VIBRATION-ABSORBING SYSTEM FOR AN AUTOMOTIVE VEHICLE

BACKGROUND OF THE INVENTION

1. Field of the Invention

This invention relates to a vibration-absorbing system for an automotive vehicle, and more particularly to a system designed for absorbing low-frequency vibration of the vehicle.

2. Description of the Prior Art

In general, low-frequency vibration in an automotive vehicle may result for a number of reasons such as, for example, combustion of the air/fuel mixture in the engine, fluctuation of engine rotational speed during engine idling operation, a heterogeneous distribution of a mass on the vehicle tire or a hardness on the tire periphery, an non-uniform configuration of the rotatable portion in a brake, etc. This vibration forcedly shakes the vehicle body and in turn passenger seats mounted on the vehicle body or the steering wheel shaft supported on the vehicle body. Such vibrations cause driver and passenger discomfort and annoyance.

A vehicle body usually has a resonance frequency in relation to the forced mechanical-vibration thereof. According to experiments for determining the resonance frequency of a normal passenger car body, the resonance frequency ranges approximately from 21 to 23 Hz. Experiments have been performed by measuring the amplitudes of vibrations of the vehicle body powered by a four-cylinder, four-cycle engine at varying engine rotational speeds. In this case, the engine serves as a frequency-variable vibration source for forcedly shaking the vehicle body with a frequency depending upon the rate of combustion of the air/fuel mixture in the engine.

The results of the experiments are shown in FIGS. 5 and 6. The amplitudes of vertical vibrations of the steering wheel supported on the vehicle body peak at engine speeds near 700 (RPM), as shown by the solid curve D of FIG. 5. The amplitudes of the vertical vibrations of the seat mounted on the vehicle body peak at engine speeds near 650 (RPM), as shown by the solid curve E of FIG. 6. Since the rate of combustion of the air/fuel mixture is twice the frequency of the engine crankshaft rotation in the four-cylinder, four-cycle engine, the resonance frequency of the vehicle body is estimated at a value ranging approximately from 21 to 23 Hz. Unfortunately, engine speeds of 650 to 700 (RPM) are encountered under engine idling operations. Thus, under idling conditions low-frequency vibrations are particularly troublesome.

A conventional methed of suppressing such a low-frequency vibration in an automotive vehicle is to enhance the hardness of the vehicle body. The method, however, necessitates reinforcement or increase in thickness of vehicle body members, making the vehicle heavier and increasing the number of steps of manufacturing or assembling the vehicle.

SUMMARY OF THE INVENTION

It is an object of the present invention to provide a vibration-absorbing system for an automotive vehicle which is relatively light in weight and has an adequately large capability of absorbing vibration.

Another object of the present invention is to provide a vibration-absorbing system for an automotive vehicle which is tuned to the resonance frequency of the vehicle body in relation to forced vibration thereof to efficiently suppress the vibrations of the vehicle body.

It is a further object of the present invention to provide a vibration-absorbing system for an automotive vehicle which efficiently suppresses the vibrations of the vehicle body under vehicle idling operations.

Yet another object of the invention is to provide a vibration-absorbing system in a vehicle which utilizes a normally occurring vehicle accessory as the damping mass. Such suitable accessories include, for example, the vehicle radiator, battery and the like.

According to the present invention, a vibration-absorbing system for an automotive vehicle with a vehicle body includes an automotive vehicle accessory and a mounting device. The mounting device has at least a portion thereof which is resilient. The mounting device attaches the accessory to the vehicle body so that the accessory will be resiliently supported on the vehicle body. The accessory with the mounting device is able to be vibrated and has an eigenfrequency in relation to the vibration thereof. The eigenfrequency is set to a relatively low value.

The above and other objects, features and advantages of the present invention will be apparent from the following description of preferred and alternative embodiments thereof, taken in conjunction with the drawings.

DESCRIPTION OF THE PREFERRED EMBODIMENTS

Figure 1:
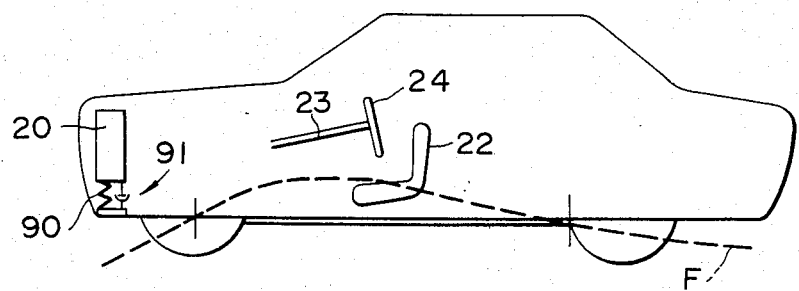
FIG. 1 is a diagrammatic view of an automotive vehicle equipped with a vibration-absorbing system according to a first embodiment of the present invention.

With reference to FIG. 1, there is shown an automotive vehicle having a radiator 20 as an accessory, which is supported on the vehicle body near the front end thereof. The vehicle also has a seat 22 mounted on the vehicle body near the center thereof and a steering wheel shaft 23 with a steering wheel 24 supported on the vehicle body.

Figures 2, 3:
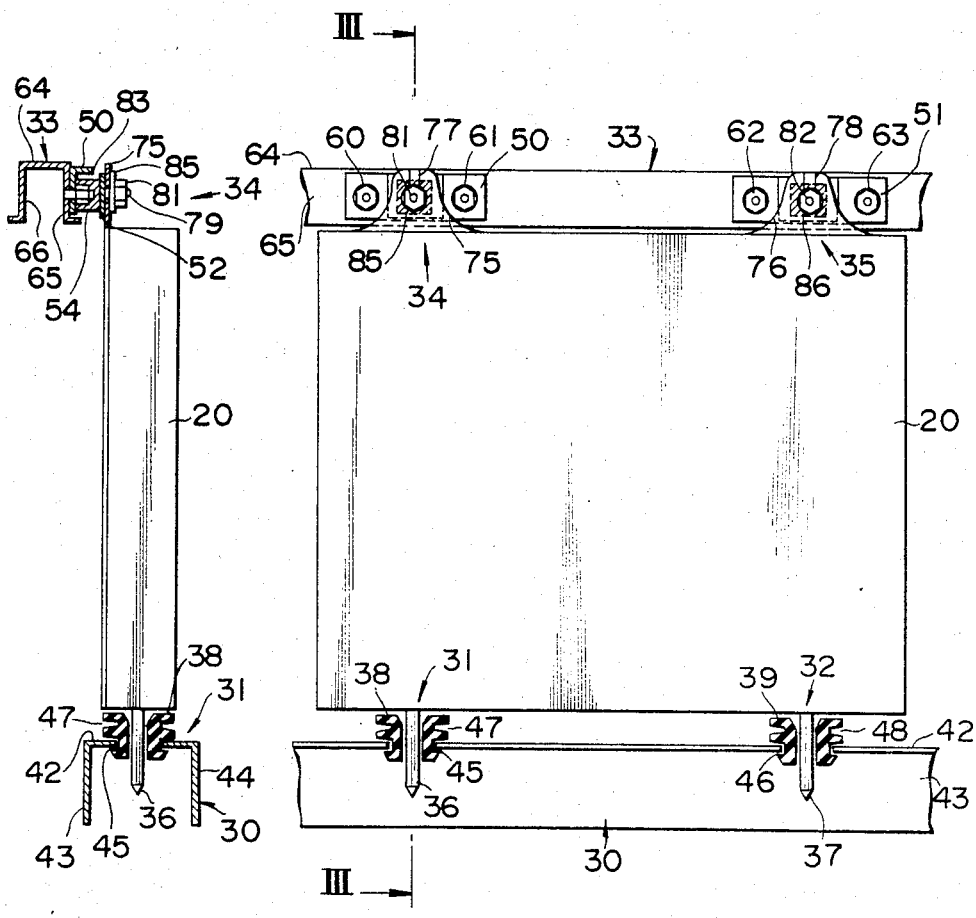
FIG. 2 is a plan view of the vibration-absorbing system of the first embodiment of the present invention with lower portions thereof cut away and shown in section.
FIG. 3 is a sectional view of the vibration-absorbing system taken on line III-III of FIG. 2.
Figure 4:
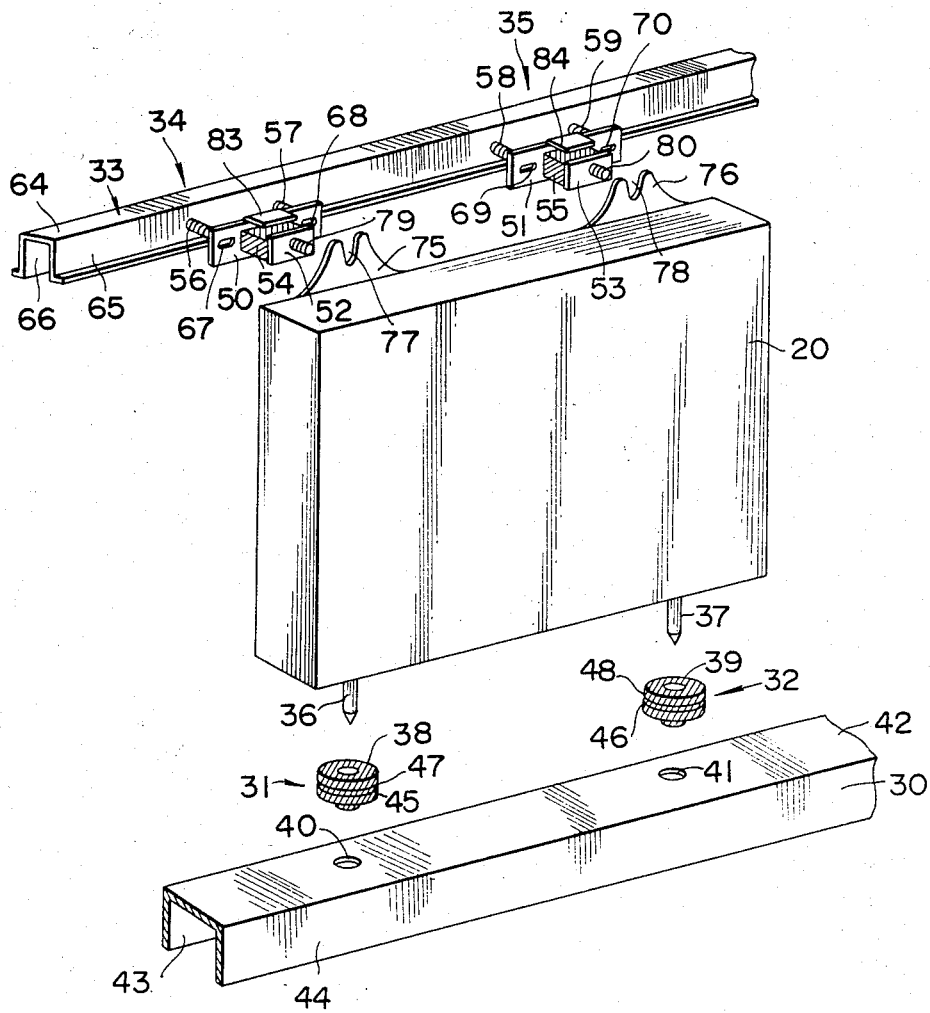
FIG. 4 is a perspective exploded-view of the vibration-absorbing system of FIGS. 2 and 3.

As shown in FIGS. 2 to 4, the radiator 20 of a substantially rectangular outline with a small thickness is attached at its lower end to a first cross-member 30 of the vehicle body by means of a pair of lower mounting devices 31 and 32 and at its upper end to a radiator core support 33 of the vehicle body by means of a pair of upper mounting devices 34 and 35. The first cross-member 30 and the radiator core support 33 extend transversely with respect to the vehicle longitudinal axis. The radiator 20 is essentially perpendicular to the longitudinal axis of the vehicle body. The lower mounting devices 31 and 32 are attached to the opposite ends of the bottom surface of the radiator 20 respectively. The upper mounting devices 34 and 35 are attached to the opposite ends of the top of the radiator 20 respectively, and are approximately located directly above the lower mounting devices 31 and 32 respectively. The lower mounting devices 31 and 32 are designed similarly to each other. The upper mounting devices 34 and 35 are designed similarly to each other.

The lower mounting devices 31 and 32 include rods 36 and 37, and tubular resilient members 38 and 39 respectively made, for example, from rubber. The rods 36 and 37 are secured to the radiator 20 and protrude downwardly from the opposite ends of the bottom surface of the radiator 20 respectively. The rods 36 and 37 extend into the cross-member 30 through holes or apertures 40 and 41, respectively, provided in the cross-member 30 wall. The cross-member 30 is of inverted-U shaped section and consists of a top wall 42, and opposite side walls 43 and 44 extending downwards from the top wall 42. Specifically the holes 40 and 41 are provided through the top wall 42. The resilient members 38 and 39 are attached to the cross-member 30 at the holes 40 and 41 respectively in such a manner as to coaxially surround the respective rods 36 and 37 and pass through the respective holes 40 and 41. The resilient members 38 and 39 have axially-spaced annular grooves 45 and 46, 47 and 48, respectively, provided on their peripheries. In fact, the resilient members 38 and 39 are fitted into the respective holes 40 and 41 in such a manner that the top wall 42 is located in the lower grooves 45 and 47 to support the resilient members 38 and 39 without axial slip. Each resilient member 38 or 39 protrudes upwards from the cross-member 30 so that the top surface of each resilient member 38 or 39 can engage the lower surface of the radiator 20 to support same while spacing the radiator 20 above the cross-member 30. In this way, the radiator 20 is positioned onto the resilient members 38 and 39 while the lower end of the radiator 20 is resiliently supported on the cross-member 30 with the resilient members 38 and 39 interposed between the cross-member 30 and the radiator 20. When the lower part of the radiator 20 moves horizontally, each rod 36 or 37 can engage the cross-member 30 through the resilient member 38 or 39, thereby limiting the horizontal movement of the lower part of the radiator 20.

The upper mounting devices 34 and 35, respectively, include large rectangular plates 50 and 51, small rectangular plates 52 and 53, and rectangular resilient members 54 and 55 in the form of parallelepipeds. The resilient members 54 and 55 may be fabricated from rubber and are sandwiched securely between their respective plates 50-52 and 51-53. Each resilient member 54 or 55 is secured, for example, by baking at its opposite surfaces to the plates 50 and 52, or 51 and 53. The large plates 50 and 51 are fixed parallel to the radiator core support 33 near opposite ends of the top surface of the radiator 20 by means of screws 56 and 57, 58 and 59, and nuts 60 and 61, 62 and 63, respectively. The radiator core support 33 is of inverted-U shaped section and consists of a top wall 64 and opposite side walls 65 and 66 extending downwards from the top wall 64. Specifically, the screws 56, 57, 58, and 59 are secured to the radiator core support 33, and protrude from the side wall 65 at a right angle with respect to the side wall 65. The screws 56, 57, 58 and 59 pass through holes 67 and 68, 69 and 70 provided in the large plates 50 and 51 respectively. The nuts 60, 61, 62, and 63 are mounted on the respective screws 56, 57, 58, and 59 so as to press the large plates 50 and 51 against the side wall 65 to secure them.

The upper mounting devices 34 and 35 further include tabs 75 and 76 respectively, which are secured to the radiator 20 and protrude upwardly from the opposite ends of the top surface of the radiator 20 respectively. Each tab 75 or 76 is provided with a groove 77 or 78 which extends downwardly from the top to the center of the tab 75 or 76. Screws 79 and 80 are secured to and protrude from the small plates 52 and 53 at a right angle with respect to the plates 52 and 53, oppositely to the resilient members 54 and 55 respectively. The screws 79 and 80 pass through the grooves 77 and 78 respectively. Nuts 81 and 82 are mounted on the screws 79 and 80 so as to press the tabs 75 and 76 against the small plates 52 and 53 to resiliently attach the upper end of the radiator 20 to the radiator core support 33. Washers 85 and 86 are mounted on the screws 79 and 80 respectively so as to be sandwiched firmly between the nuts 81 and 82, and the respective tabs 75 and 76. In this way, the upper mounting devices 34 and 35 space the radiator 20 away from the radiator core support 33 in such a manner that the upper end of the radiator 20 is resiliently supported on the radiator core support 33 with the resilient members 54 and 55 substantially interposed between the support 33 and the radiator 20. Meanwhile, each large plate 50 or 51 is integrally provided at its top end with a horizontally extending stopper 83 or 84, which is spaced above the resilient member 54 or 55 so that the resilient member 54 or 55 can contact the stopper 83 or 84 upon deformation thereof. The stoppers 83 and 84, therefore, limit the upward movement of the radiator 20.

Figure 5:
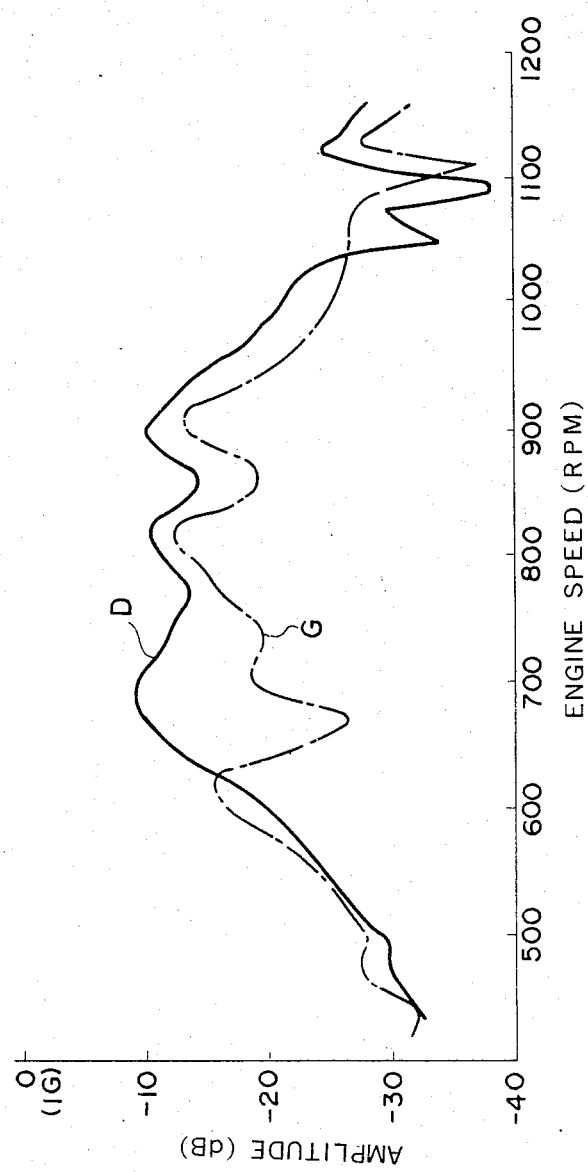
FIG. 5 is a graph of vibration amplitude of a steering wheel versus engine rotational speed.
Figure 6:
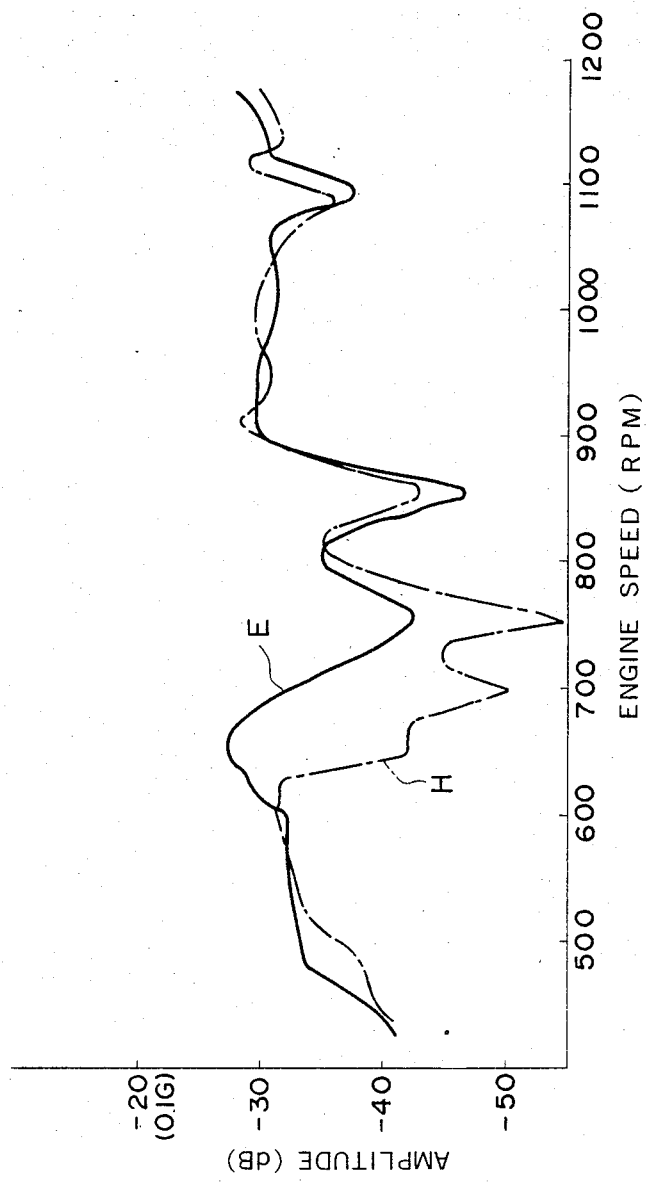
FIG. 6 is a graph of vibration amplitude of a seat versus engine rotational speed.

The radiator 20, the lower mounting devices 31 and 32, and the upper mounting devices 34 and 35 constitute a vibration-absorbing system attached to the front end of the vehicle body. This system has an eigenfrequency (natural or resonance frequency) $f_o$ corresponding to a large mode of mechanical vibration of the system;

$$f_o = \frac{1}{2\pi} \sqrt{\frac{(k1 + k2)}{(W/g)}} .$$

where W is a weight of the radiator 20, g is the acceleration of gravity, k1 is a resultant spring modulus of the upper mounting devices 34 and 35, and k2 is a resultant spring modulus of the lower mounting devices 34 and 35. The eigenfrequency $f_o$ is most preferably set equal to a relatively low resonance-frequency of the vehicle body in relation to the forced mechanical-vibration thereof or equal to a frequency of combustion of the air/fuel mixture in the idling vehicle engine which causes the low-frequency vehicle body vibrations induced under vehicle engine idling operations. For example, when the vehicle body has a resonance frequency ranging approximately from 21 to 23 Hz similarly to that previously described with reference to FIGS. 5 and 6, the frequency $f_o$ is preferably set to a value of approximately 20 to 30 Hz and most preferably set to a value of approximately 21 to 23 Hz to obtain a vibration-suppression effect. These values of the frequency $f_o$ may be adjusted in the manner by setting $(k1+k2)/(W/g)$ equal to values approximately ranging from 15,775 to 34,595 and from 17,392 to 20,863 respectively. When the vehicle is driven by a four-cylinder, four-cycle engine whose idle speed is set to a value of 700 to 750 RPM, the frequency $f_o$ is preferably set to a value of approximately 20 to 30 Hz and most preferably set to a value of approximately 23 to 25 Hz to obtain a vibration-suppression effect under engine idling operations. These values of the frequency $f_o$ may be also adjusted in the manner by setting $(k1+k2)/(W/g)$ equal to values approximately ranging from 15,775 to 34,595 and from 17,392 to 24,649 respectively.

As shown by the broken line F in FIG. 1, the vibration mode of the vehicle body in a low-frequency band of 20 to 40 Hz has two nodes located near the front and rear wheels respectively, and three antinodes the largest located near the front end of the vehicle body, and the others located near the rear end of the vehicle body and near the seat 22 and steering wheel shaft 23, respectively. As a result of such vibrations, the seat 22 and steering wheel shaft 23 would be forcedly vibrated with great amplitudes while the radiator 22 near the front end of the vehicle body would be forcedly vibrated with a much greater amplitude. However, in accordance with the invention, the radiator 20 and lower mounting devices 34 and 35 act as a low-frequency vibration-absorbing device. Since this vibration-absorbing device is attached to the vehicle body near its front end at which the greatest antinode of the vibration mode F occurs and since the absorbing device is tuned to the low-frequency vibration of the vehicle body, the low-frequency vibration is effectively suppressed to an acceptably low level. In other words, the above system acts as a resonance-type dynamic damper, the mass of which is substantially constituted by the radiator 20 and the spring of which is constituted by the resilient members 38 and 39, 54 and 55 of the lower an upper mounting devices 31 and 32, 34 and 35. Since this dynamic damper is of the resonance type, it can suppress the vehicle body vibration sufficiently using resilient members 38, 39, 54, and 55 of relatively small weight. Therefore, the vehicle body vibrations are sufficiently reduced without increasing the weight of the vehicle or the number of steps of manufacturing or assembling the vehicle. In FIG. 1, the numeral 90 designates each resilient member 38, 39, 54, or 55 while the numeral 91 designates a small damper which is constituted by each resilient member 38, 39, 54, or 55 per se.

According to experiments for measuring vibrations of the vehicle body powered by the four-cylinder, four-cylinder engine at varying engine rotational speeds, the amplitudes of the low-frequency vibrations of the vehicle body at engine speeds ranging from 650 to 700 (RPM) are remarkably reduced. In such measurements the eigenfrequency $f_o$ of the vibration-absorbing system is set to 23 Hz; the weight of the radiator 20 is set to 15 kg; the spring modulus of each resilient member 54 or 55 is set to 1.5 kg/mm; the spring modulus of each resilient member 38 or 39 is set to 15 kg/mm; and the damping factor of each damper 91 is set to a relatively small value. In fact, as shown by the broken curve G of FIG. 5, the amplitudes of the vertical vibrations of the steering wheel 24 at engine speeds ranging from 650 to 700 are considerably reduced as compared to the solid curve D of FIG. 5 obtained with a conventional vehicle body. As shown by the broken curve H of FIG. 6, the amplitudes of the vertical vibrations of the seat 22 at engine speeds ranging from 650 to 750 are also considerably reduced as compared to the solid curve E of FIG. 6 obtained with the conventional vehicle body.

The above results of the experiments are obtained under conditions where the damping factor of each damper 91 is set to a relatively small value. On the other hand, the damping factor may be set to a relatively large value. In this case, the dynamic damper, that is, the vibration-absorbing system, is presumed to suppress the vibrations of the vehicle body over a relatively broad range of frequency.

Figure 7:
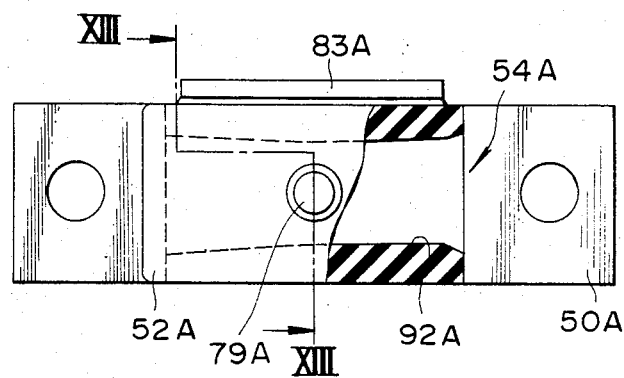
FIG. 7 is a plan view of an upper mounting device according to a first alternative embodiment of the present invention with a part thereof broken away and shown in section.
Figure 8:
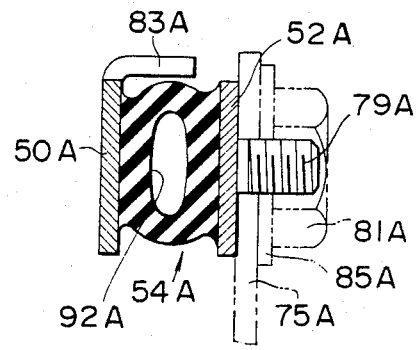
FIG. 8 is a sectional view of the upper mounting device taken on line VIII—VIII of FIG. 7.

A first alternative embodiment of each upper mounting device is shown in FIGS. 7 and 8, wherein similar or corresponding elements are designated by the same numerals with letters as those of FIGS. 2 to 4. The upper mounting devices of this alternative embodiment are similar to each other, so that only one device will be described. This alternative embodiment is designed in a manner similar to that shown in FIGS. 2 to 4 except for the following point. A resilient member 54A sandwiched securely between large and small plates 50A and 52A is of annular section, and consequently has a central hole 92A which horizontally extends parallel to the plates 40A and 52A. The original shape of the resilient member 54A is a transversely extending cylinder. This cylindrical configuration increases the hardness of the resilient member 54A in the transverse direction with respect to the vehicle body, thereby limiting the transverse movement of the radiator 20 (see FIGS. 1 to 4). In FIG. 7 a tab 75A, a nut 81A, and a washer 85A are omitted for simplicity of illustration.

Figure 9:
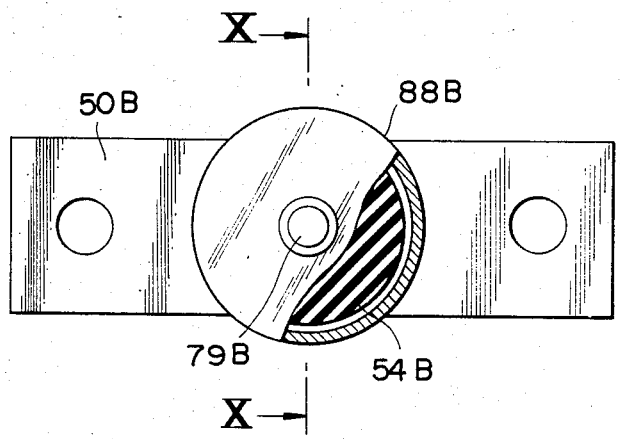
FIG. 9 is a plan view of an upper mounting device according to a second alternative embodiment of the present invention with a part thereof broken away and shown in section.
Figure 10:
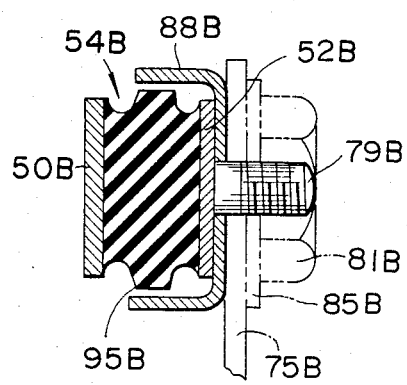
FIG. 10 is a sectional view of the upper mounting device taken on line X—X of FIG. 9.

A second alternative embodiment of each upper mounting device is shown in FIGS. 9 and 10, wherein similar or corresponding elements are designated by the same numerals with letters as those of FIGS. 2 to 4. The upper mounting devices of this alternative embodiment are similar to each other, so that only one device will be described. This alternative embodiment is designed in a manner similar to that shown in FIGS. 2 to 4 except for the following points. A resilient member 54B sandwiched securely between large and small plates 50B and 52B is approximately in the form of a thick disk, which is coaxial with a screw 79B secured to the small plates 52B. The opposite circular surfaces of the resilient member 54B are thus attached to the large and small plates 50B and 52B respectively. The small plate 52B is circular corresponding to the circular surface of the resilient member 54B. A cup-shaped stopper 88B is securely sandwiched at its bottom between the smaller plate 50B and a tab 75B secured to a radiator 20 (see FIGS. 1 to 4). The cylindrical portion of the stopper 88B extends coaxially around the resilient member 54B in such a manner that the stopper 88B surrounds the small plate 52B and a part of the resilient member 54B. The resilient member 54B is provided on its periphery with an annular projection 95B, which is positioned inside the stopper 88B with a predetermined-thickness annular gap formed therebetween. When the resilient member 54B is deformed to a predetermined extent by the movement of the radiator 20 (see FIGS. 1 to 4) in any direction, the projection 54B of the resilient member 54B contacts the cylindrical portion of the stopper 88B. Thus, the stopper 88B limits a movement of the radiator 20 (see FIGS. 1 to 4) in any direction. The larger plate 50B has no projection serving as a stopper. In FIG. 9 a tab 75B, a nut 81B, and a washer 85B are omitted for simplicity of illustration.

Figure 11:
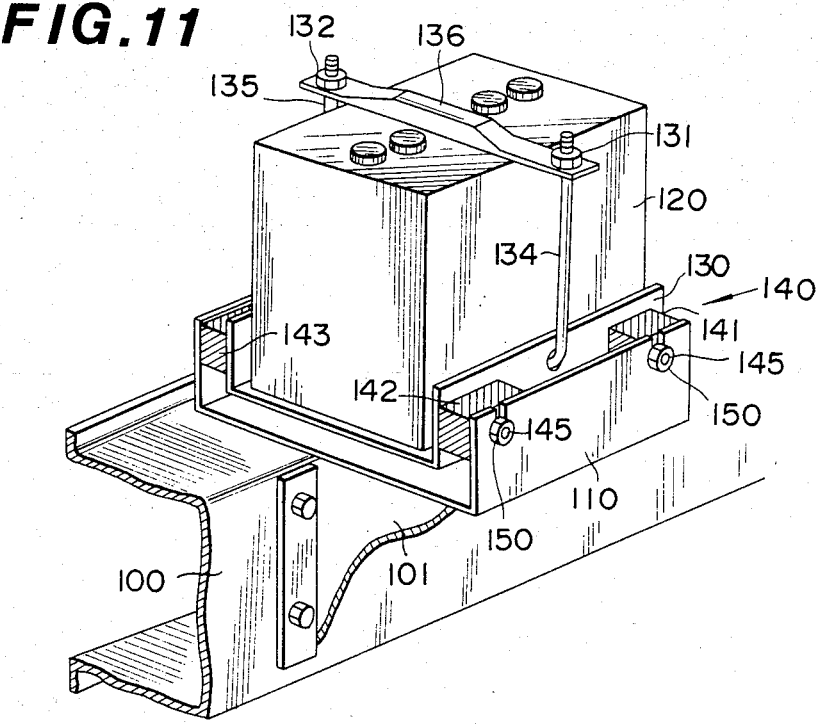
FIG. 11 is a perspective view of a vibration-absorbing system according to a second embodiment of the present invention.
Figure 12:
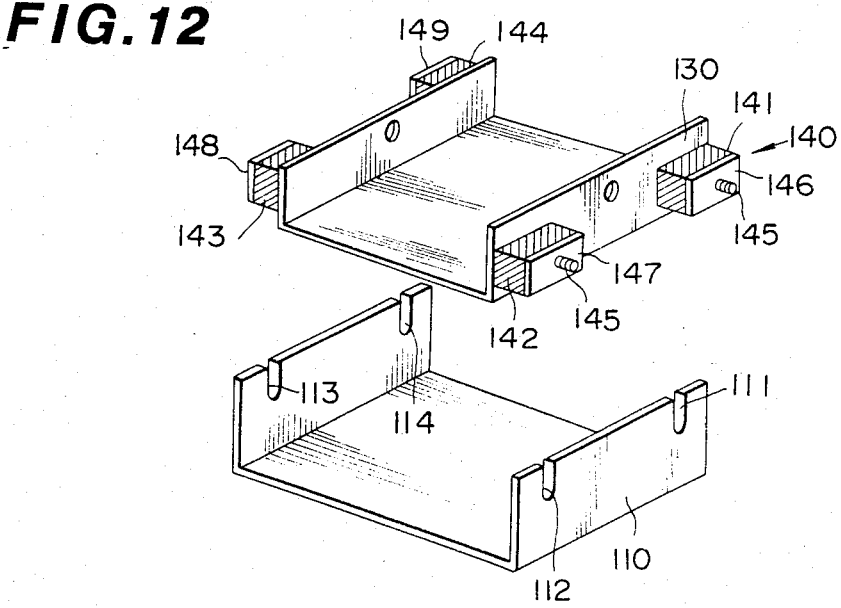
FIG. 12 is a perspective exploded-view of the upper and lower brackets of FIG. 10.

Referring to FIGS. 11 and 12, there is shown a vibration-absorbing system according to a second embodiment of the present invention. This system includes an automotive vehicle accessory consisting of a battery 120 instead of a radiator. A battery bracket consists of lower and upper brackets 110 and 130. The lower bracket 110 is secured to the front face of a vehicle body side member 100 by means of a couple of webs 101 between the body side member 100 and the lower bracket 110. Only of the webs 101 is shown in FIG. 11. The upper bracket 130 removably holds the battery 120 and is connected to the lower bracket 110 by means of a resilient mounting device 140. In this way the battery 120 is resiliently supported on the vehicle body, and is generally located in an engine compartment at the front end of the vehicle body.

Specifically, the upper bracket 130 is of U-shaped section so as to accommodate the lower part of the battery 120. A pair of rods 134 and 135 extend vertically near opposite faces of the battery 120. The lower ends of the rods 134 and 135 are engaged to the opposite side walls of the upper bracket 130 respectively. The upper ends of the rods 134 and 135 are threaded and pass through opposite ends of a bar 136 respectively, which extends across the top surface of the battery 120. A pair of nuts 131 and 132 are mounted on the upper ends of the rods 134 and 135 respectively to press the bar 136 downwards so that the upper bracket 130 and the bar 136 will clamp the battery 120 therebetween.

The mounting device 140 includes rectangular parallelepiped resilient members 141, 142, 143, and 144 made, for example, of rubber. The resilient members 141 and 142 are attached, for example, by baking to the opposite ends of the outer surface of the upper bracket 130 side wall respectively. The resilient members 143 and 144 are attached, for example, also by baking to the opposite ends of the outer surface of the other upper bracket 130 side wall respectively. Rectangular plates 146, 147, 148, and 149 are attached, for example, by baking, to the surfaces of the resilient members 141, 142, 143, and 144 respectively opposite to the upper bracket 130 side walls. A screw 145 is secured to each plate 146, 147, 148, or 149 and protrudes from the plate oppositely to the respective resilient member 141, 142, 143, or 144.

The lower bracket 110 is of U-shaped section greater than that of the upper bracket 130 so as to accommodate the upper bracket 130 with the resilient members 141, 142, 143, and 144. Each side wall of the lower bracket 110 is provided with a couple of grooves 111 and 112, or 113 and 114 in the form of a vertically extending slot. Each screw 145 passes through the groove 111, 112, 113, or 114. A nut 150 is mounted on each screw 145 so as to press the lower bracket 110 against the plate 146, 147, 148, or 149 on the resilient member 141, 142, 143, or 144. The lower bracket 110 is spaced from the upper bracket 130 with the resilient members 141, 142, 143, and 144 substantially interposed between the lower and upper brackets. In this way, the upper bracket 130 is resiliently supported on the lower bracket 110, so that the battery 120 is in turn also resiliently supported on the vehicle body.

The battery 120, the upper bracket 130, and the resilient members 141, 142, 143, and 144 constitute a resonance-type dynamic damper attached to the front end of the vehicle body. This dynamic damper operates similarly to that of the previous first embodiment provided that its eigenfrequency is set equal to the resonance frequency of the vehicle body in relation to low-frequency mechanical vibration or equal to the relatively low-frequency of the vehicle body vibration induced under vehicle engine idling operation. The mass of this damper is substantially constituted by the mass of the battery 120, and the spring thereof is constituted by the resilient members 141, 142, 143, and 144.

It should be understood that further modifications and variations may be made in the present invention without departing from the spirit and scope of the present invention as set forth in the appended claims.

What is claimed is:

1. A vibration-absorbing system for a vehicle having a body, said vehicle normally having thereon a vehicle accessory utilized in operation of said vehicle, said system comprising:
   (a) means for securing said vehicle accessory to said vehicle body, said securing means being nonresilient; and
   (b) resilient means positioned by said securing means between said vehicle accessory and said vehicle body for permitting resonant movement of said accessory for damping vibration of said vehicle;
   the mass of said accessory and spring modulus of said resilient means being effective to damp relatively low frequency vehicle vibrations with a frequency equal to the resonance frequency of said vehicle body in relation to forced vibration thereof, said low frequency vibrations being in the range of approximately 20 to 30 Hz.

2. A vibration-absorbing system for a vehicle having a body, said vehicle normally having thereon a vehicle accessory utilized in operation of said vehicle, said system comprising:
   (a) means for securing said vehicle accessory to said vehicle body, said securing means being nonresilient; and
   (b) resilient means positioned by said securing means between said vehicle accessory and said vehicle body for permitting resonant movement of said accessory for damping vibration of said vehicle;
   the mass of said accessory and spring modulus of said resilient means being effective to damp relatively low frequency vehicle vibrations with a frequency equal to the resonance frequency of said vehicle body in relation to forced vibration thereof, said low frequency vibrations being in the range of approximately 21 to 23 Hz.

3. A vibration-absorbing system for an automotive vehicle having a vehicle body, comprising:
   (a) an engine radiator, said radiation being rectangular with a small thickness; and
   (b) a mounting device having a resiliency, the mounting device engaging the radiator to the vehicle body so that the radiator will be resiliently supported on the vehicle body; said mounting device including a pair of lower mounting devices and a pair of upper mounting devices, the lower mounting devices engaging the opposite ends of the bottom of the radiator respectively to a first cross-member of the vehicle body, the upper mounting devices engaging the opposite ends of the top of the radiator respectively to a radiator core support of the vehicle body, each of the upper mounting devices comprising a resilient member which is secured to both the radiator and the radiator core support in such a manner as to be substantially interposed therebetween, the resilient member of each upper mounting device being in the form of a rectangular parallelepiped whose opposite surfaces are secured to the radiator and the radiator core support respectively; and (c) two stoppers secured to the radiator core support, the stoppers being positioned above the resilient members of the upper mounting devices respectively so that each resilient member can contact the respective stopper when deforming toward the stopper to a predetermined extent; p2 the radiator with the mounting device being able to be vibrated, the radiator with the mounting device having an eigenfrequency in relation to the vibration thereof, the eigenfrequency being equal to the resonance frequency of the vehicle body in relation to a forced vibration thereof.

4. A vibration-absorbing system for an automotive vehicle having a vehicle body, comprising:

(a) an engine radiator, said radiator being rectangular in shape and having a small thickness; and (b) a mounting device having a resiliency, the mounting device engaging the radiator to the vehicle body so that the radiator will be resiliently supported on the vehicle body; the mounting device including a pair of lower mounting devices and a pair of upper mounting devices, the lower mounting devices engaging the opposite ends of the bottom of the radiator respectively to a first cross-member of the vehicle body, the upper mounting devices engaging the opposite ends of the top of the radiator respectively to a radiator core support of the vehicle body, each of the upper mounting devices comprising a resilient member which is secured to both the radiator and the radiator core support in such a manner as to be substantially interposed therebetween, the resilient member of each upper mounting device in the form of a thick disk whose opposite circular surfaces are secured to the radiator and the radiator core support respectively, the radiator with the mounting device being able to be vibrated, the radiator with the mounting device having an eigenfrequency in relation to the vibration thereof, the eigenfrequency being equal to the resonance frequency of the vehicle body in relation to a forced vibration thereof.

5. A vibration-absorbing system as recited in claim 4, further comprising two stoppers secured to the radiator, the stoppers having cylindrical portions respectively, the cylindrical portions surrounding coaxially the resilient members of the upper mounting devices respectively so that each resilient member can contact the respective stopper when deforming in any direction to a predetermined extent.

6. A vibration-absorbing system for an automotive vehicle having a vehicle body, comprising:

(a) an automotive vehicle battery; and (b) a mounting device having a resiliency, the mounting device engaging the battery to the front end of the vehicle body so that the battery will be resiliently supported on the vehicle body;

the mounting device including an upper bracket of U-shaped section having first and second opposing side walls, each of the first and second upper bracket side walls having opposite free edges, a lower bracket of U-shaped section larger than the upper bracket and having first and second opposing side walls, each of the first and second lower bracket side walls having opposite free edges, and first, second, third, and fourth rectangular parallelepiped resilient members, the upper bracket being secured to the battery, the first and second resilient members each being attached at one surface to an outer surface of the first upper bracket side wall adjacent a free edge thereof and at an opposite surface to an inner surface of the first lower bracket side wall adjacent a free edge thereof, the third and fourth resilient members each being attached at one surface to an outer surface of the second upper bracket side wall adjacent a free edge thereof and at an opposite surface to an inner surface of the second lower bracket side wall adjacent a free edge thereof, the lower bracket being spaced from the upper bracket and secured to the vehicle body so that the battery will be resiliently supported on the vehicle body.

7. A vibration-absorbing system as recited in claim 6, wherein the battery with the mounting device is able to be vibrated and has an eigenfrequency in relation to the vibration thereof, the eigenfrequency being equal to the resonance frequency of the vehicle body in relation to forced vibration thereof.

8. A vibration-absorbing system as recited in claim 1, wherein the eigenfrequency is in the range of approximately 20 to b 30 Hz.

9. A vibration-absorbing system as recited in claim 1, wherein the eigenfrequency is in the range of approximately 21 to 23 Hz.

10. A vibration-absorbing system for an automotive vehicle having a body and an engine carried thereon, the system comprising:

(a) an automotive vehicle battery; and (b) a mounting device having a resiliency, the mounting device engaging the battery to the front end of the vehicle body so that the battery will be resiliently supported on the vehicle body;

the battery with the mounting device being able to be vibrated, the battery with the mounting device having an eigenfrequency in relation to the vibration thereof, the eigenfrequency being equal to the frequency of combustion of the air/fuel mixture in the vehicle engine under engine idling operation;

the mounting device including an upper bracket of U-shaped section having first and second opposing side walls, each of the first and second upper bracket side walls having opposite free edges, a lower bracket of U-shaped section larger than the upper bracket and having first and second opposing side walls, each of the first and second lower bracket side walls having opposite free edges, and first, second, third and fourth rectangular parallelepiped resilient members, the upper bracket being secured to the battery, the first and the second resilient members each being attached at one surface to an outer surface of the first upper bracket side wall adjacent the free edges thereof and at an opposite surface to an inner surface of the first lower bracket side wall adjacent the free edges thereof the third and the fourth resilient members each being attached at one surface to an outer surface of the second upper bracket side wall adjacent the free edges thereof and at an opposite surface to an inner surface of the second lower bracket side wall adjacent the free edges thereof the lower bracket being spaced from the upper bracket and secured to the vehicle body so that the battery will be resiliently supported on the vehicle body.

11. A vibration-absorbing system as recited in claim 10, wherein the vehicle engine is of the 4 cycle, 4 cylinder type and the eigenfrequency is in the range of approximately 20 to 30 Hz.

12. A vibration-absorbing system as recited in claim 10, wherein the vehicle engine is of the 4 cycle, 4 cylinder type and the eigenfrequency is in the range of approximately 23 to 25 Hz.

13. A vibration-absorbing system for an automotive vehicle having a vehicle body, comprising:
   (a) an automotive vehicle battery; and
   (b) a mounting device having a resiliency, the mounting device engaging the battery to the vehicle body so that the battery will be resiliently supported on the vehicle body wherein the mounting device comprises:
   an upper bracket of U-shaped section having first and second opposing side walls, the upper bracket being secured to the battery; a lower bracket of U-shaped section larger than the upper bracket and having first and second opposing side walls, the lower bracket being spaced from the upper bracket and secured to the vehicle body; and first and second resilient members, the first resilient member being attached at one surface to an outer surface of the first upper bracket side wall and at an opposite surface to an inner surface of the first lower bracket side wall, the second resilient member being attached at one surface to an outer surface of the second upper bracket side wall and at an opposite surface to an inner surface of the second lower bracket side wall;
   the battery with the mounting device being able to be vibrated, the battery with the mounting device having an eigenfrequency in relation to the vibration thereof, the eigenfrequency being equal to the resonance frequency of the vehicle body in relation to a forced vibration thereof.

* * * * *